United States Patent Office 3,573,335
Patented Mar. 30, 1971

3,573,335
MODIFICATION OF TOLUYLENEDIISOCYANATES
Juntaro Yurimoto and Yoshindo Kojima, Niihama-shi, Japan, assignors to Sumitomo Chemical Company, Ltd., Osaka, Japan
No Drawing. Filed Jan. 12, 1968, Ser. No. 697,297
Claims priority, application Japan, Jan. 20, 1967, 42/3,961
Int. Cl. C07c 19/04; C08g 22/46
U.S. Cl. 260—453
5 Claims

ABSTRACT OF THE DISCLOSURE

Modified toluylenediisocyanates, which are useful for the production of rigid polyurethane foams according to one-shot method, are produced by heating toluylenediisocyanates in the presence of specific organo-tin compounds as catalysts, and the modified toluylenediisocyanates are entirely stable and precipitate no insolubles and have a viscosity of 20–300 cps. at 25° C. and have such a low freezing point as below 0° C.

---

Polyurethane foams can be obtained by reacting compounds having at least 2 active hydrogen atoms with organic isocyanates in the presence of blowing agents, catalysts, surfactants, and the like. Particularly for the production of a rigid polyurethane foam from a tolylenediisocyanate and a polyol, there has been adopted a so-called prepolymer method in which the toluylenediisocyanate is reacted with a part of the polyol to form a prepolymer, and then the remainder of polyol is added at the stage of foaming to complete the reaction.

As compared with such a prepolymer method, the one-shot method, in which the foaming is completed at one stage, is simple and convenient. However, the production of rigid polyurethane foams according to one-shot method using purified toluylenediisocyanates has not been practically successful up to date.

As isocyanates suitable for use in the one-shot method, crude toluylenediisocyanates containing 20–50% by weight of tarry matter have been known. The use of the crude toluylenediisocyanates is not only advantageous in view of the production step because the one-shot method is applicable thereto, but also contributes to the improvements in physical properties of the resulting rigid polyurethane foams. In preparing a toluylenediisocyanate by the reaction of toluylenediamine and phosgen, a tarry matter is by-produced. This tarry matter has been uniformly incorporated in the toluylenediisocyanate and is not distilled out, so that it remains as the residue in distillation. The amount of the tarry matter by-produced is ordinarily about 5% by weight. It is known that the aforesaid crude toluylenediisocyanate is obtained by merely subjecting such mixture of toluylenediisocyanate and tarry matter to reduced pressure distillation, thereby removing the toluylenediisocyanate to increase the content of the tarry matter. On the other hand, it has been observed that, when allowed to stand, toluylenediisocyanates tend to precipitate insolubles and, particularly, crude toluylenediisocyanates, in which the above-mentioned tarry matter is present in a concentrated form, are extremely unstable and ordinarily precipitate several percent of insolubles in a short period of time. It is considered that said insolubles might probably be dimers and/or polymers inherent to isocyanates, and the formation thereof is further promoted by the concentration of said tarry matter. Such insolubles cause fatal drawback in foaming operations, particularly in mechanical foaming, to bring about great disadvantages.

An object of the present invention is to prepare modified toluylenediisocyanates suitable for the production of rigid polyurethane foams according to one-shot method which are entirely stable and precipitate no insolubles. Other objects will become apparent from the descriptions that follow.

The present invention provides a method for modifying a toluylenediisocyanate which comprises treating a toluylenediisocyanate at an elevated temperature in the presence of a catalyst selected from organo-tin compounds represented by the general formula $$RR'Sn(OOC \cdot CH = CH \cdot COO \cdot C_mH_{2m}OH)_2$$

wherein R and R' are alkyl groups and m means an integer of from 2 to 4.

In accordance with the method of the present invention, a part of the toluylenediisocyanate is converted into a non-volatile tarry matter. Such modified toluylenediisocyanates do not precipitate insolubles any more.

As toluylenediisocyanates employed in the present invention, toluylenediisocyanates obtained by phosgenation of toluylenediamine are typical ones, but even toluylenediisocyanates obtained by other methods than the phosgenation of toluylenediamines may be employed. Although toluylenediisocyanates obtained by the phosgenation of toluylenediamines contain usually several percents by weight of tarry matter, it is not necessary in the modification of the present invention to remove the tarry matter from toluylenediisocyanates thus obtained. Toluylenediisocyanate having 20–50% by weight of tarry matter content is desired as so-called crude toluylenediisocyanate in general, therefore toluylenediisocyanate whose tarry matter content is not more than the said range is employed as raw material in the modification of the present invention. In case tarry matter content in toluylenediisocyanate is above 50% by weight, effect of the modification of the present invention is decreased. Preferably toluylenediisocyanate having below 15% by weight of tarry matter content is used.

The organo-tin compounds employed in the present method are represented by the general formula $$RR'Sn(OOC \cdot CH = CH \cdot COO \cdot C_mH_{2m}OH)_2$$

wherein R and R' are alkyl groups and m means an integer of from 2 to 4. Typical examples of the organo-tin compounds of the present invention include di-n-octyltin-di(propylene glycol maleate), di-n-butyltin-di(propylene glycol maleate), di-n-octyltin-di(butylene glycol maleate), di-n-pentyltin-di(propylene glycol maleate) and di-n-butyltin-di(ethylene glycol maleate). The amount of catalyst to be used is 0.001–1%, preferably 0.01–0.1%, by weight based on the amount of the toluylenediisocyanate.

The modification temperature affects the modification rate by means of catalyst and the properties of the resulting product. While a catalyst action is observed even at 150° C., a particularly preferable modification temperature is in the range of 200°–260° C. At elevated temperatures, the catalyst action is accelerated but toluylenediisocyanate itself undergoes vigorous decomposition, and therefore the adoption of a temperature above 270° C. is not desirable. The heating may be effected either at one stage or at two stages, e.g. first at 150°–200° C. and then at 200°–270° C. Period of time for the modification of the present invention depends upon the tarry matter content in toluylenediisocyanate used as starting material and the objective tarry matter content in the modified toluylenediisocyanate, and in general, the period of time is desired for longer period of time than 2 hours. The catalyst or toluylenediisocyanate to be treated may be divisionally added to the heating zone.

The modified isocyanate obtained according to the method of the present invention has the following advantages:

(1) The products are low in isocyanate group content per unit weight as compared with purified toluylenediisocyanates, and hence bring about no excessive heat generation and temperature increase in the reaction with polyols to make it possible to obtain according to one-shot foaming method rigid polyurethane foam excellent in properties.

(2) The products ordinarily have a viscosity of 20–300 cps. at 25° C. and are entirely homogeneous and stable liquid compositions depositing no insolubles. Further, they are not so excessively low in viscosity as purified toluylenediisocyanate and can be handled with extreme care in mechanical foaming. In addition, they have such a low freezing point as below 0° C. and hence encounter no difficulties in transportation and use in winter time, unlike purified toluylenediisocyanates.

(3) The tarry matter by-produced in the phosgenation reaction is not required to be wasted by distillation and separation, but toluylenediisocyanate mixtures containing the tarry matter can be formed into the products at one stage to bring about marked economical, advantages.

The following examples illustrate the invention in which all the parts and percent are by weight.

EXAMPLE 1

Toluylenediisocyanate of 95% purity having 5% tarry matter content and a viscosity at 25° C. of about 10 cps. was obtained by phosgenation of a mixture consisting of about 80% 2,4-toluylenediamine and about 20% 2,6-toluylenediamine.

To 400 parts of toluylenediisocyanate thus obtained, 0.05% of di-n-octyltin-di(propylene glycol maleate) was added as catalyst, and the resulting mixture was heated with stirring at 260° C. in a dry nitrogen atmosphere to effect modification. The modification progressed in substantial proportion to the lapse of time. After heating and modifying for 6 hours, the reaction liquid was cooled to obtain 396 parts of an entirely homogeneous modified toluylenediisocyanate. The product showed a viscosity at 25° C. of 60 cps. The results of distillation test indicated that the amount of distilled toluylenediisocyanate was 78% by weight and the amount of residual tarry matter was 22% by weight.

The thus obtained modified toluylenediisocyanate precipitated no insolubles even when allowed to stand for 3 months.

EXAMPLE 2

To 400 parts of the same toluylenediisocyanate as in Example 1, 0.02% of di-n-octyltin-di(propylene glycol maleate) was added. The resulting mixture was heated with stirring at 240° C. for 10 hours in a dry nitrogen atmosphere to effect modification. Thereafter, the reaction liquid was cooled to obtain 394 parts of an entirely homogeneous modified toluylenediisocyanate. The product showed a viscosity at 25° C. of 25 cps. The results of distillation test indicated that the amount of distilled toluylenediisocyanate was 80% by weight and the amount of residual tarry matter was 20% by weight. The thus obtained modified toluylenediisocyanate precipitated no insolubles even when allowed to stand for 3 months.

EXAMPLE 3

From the same toluylenediisocyanate as in Example 1, a part of toluylenediisocyanate was removed by distillation to obtain a partially concentrated toluylenediisocyanate liquid having a tarry matter content of about 13% by weight. To 400 parts of said toluylenediisocyanate having a viscosity at 25° C. of 20 cps., 0.05% of di-n-octyltin-di(propylene glycol maleate) was added as catalyst, and the mixture was heated with stirring at 250° C. for 3 hours in a dry nitrogen atmosphere to effect modification. Thereafter, the reaction liquid was cooled to obtain an entirely homogeneous modified toluylenediisocyanate in 98% yield. The product showed a viscosity at 25° C. of 85 cps. The results of distillation test indicated that the amount of distilled toluylenediisocyanate was 79% by weight and the amount of residual tarry matter was 21% by weight. The thus obtained modified toluylenediisocyanate precipitated no insolubles even when allowed to stand for 3 months.

EXAMPLE 4

To 400 parts of the same toluylenediisocyanate as in Example 1, 0.02% of di-n-butyltin-di(propylene glycol maleate) was added as catalyst. The resulting mixture was heated with stirring at 250° C. for 8 hours in a dry nitrogen atmosphere to effect modification. Thereafter, the reaction liquid was cooled to obtain 394 parts of an entirely homogeneous modified toluylenediisocyanate. The product showed a viscosity at 25° C. of 65 cps. The results of distillation test indicated that the amount of distilled toluylenediisocyanate was 79% by weight and the amount of residual tarry matter was 21% by weight. The thus obtained modified toluylenediisocyanate precipitated no insolubles even when allowed to stand for 3 months.

EXAMPLE 5

To 400 parts of the same toluylenediisocyanate as in Example 1, 0.02% of di-n-butyltin-di(ethylene glycol maleate) was added as catalyst. The resulting mixture was heated at 250° C. for 10 hours in a dry nitrogen atmosphere to effect modification. Thereafter, the reaction liquid was cooled to obtain 392 parts of an entirely homogeneous modified toluylenediisocyanate. The product showed a viscosity at 25° C. of 90 cps. The results of distillation test indicated that the amount of distilled toluylenediisocyanate was 75% by weight and the amount of residual tarry matter was 25% by weight. The thus obtained modified toluylenediisocyanate precipitated no insolubles even when allowed to stand for 3 months.

Comparative example

The same toluylenediisocyanate as in Example 1 was subjected to the so-called conventional simple concentration method carried out by distilling the mixture at 120° C. under a reduced pressure of 10 mm. Hg to remove a definite amount of toluylenediisocyanate. As the result, there was obtained a distillation concentrated crude toluylenediisocyanate containing 20% by weight of a tarry matter which corresponded to the concentrated toluylenediisocyanate of Example 2. The product showed a viscosity at 25° C. of as high as 500 cps.

What was worse, the product began, immediately after cooling, to precipitate insolubles and, after one week, the whole body of the crude toluylenediisocyanate liquid was substantially brought into a gelled state. This gel-like substance was filtered to obtain precipitated insolubles, which were 4.2% by weight as the content of benzene-insolubles when washed with cold benzene.

We claim:

1. A method for the modification of toluylenediisocyanates, which comprises heating crude toluylenediisocyanate containing tarry matter in an amount up to 50% by weight for a longer period of time than 2 hours at a temperature between 150° and 270° C. in the presence of a catalyst selected from the group consisting of di-n-octyltin-di (propylene glycol maleate), di-n-butyltin-di (propylene glycol maleate), di-n-octyltin-di (butylene glycol maleate), di-n-pentyltin-di (propylene glycol maleate) and di-n-butyltin-di (ethylene glycol maleate).

2. A method according to claim 1, wherein said toluylenediisocyanate contains up to 15% by weight of tarry matter.

3. A method according to claim 1, wherein the catalyst is employed in an amount of 0.001–1% by weight based on the weight of the toluylenediisocyanate containing up to 50% by weight of tarry matter.

4. A method according to claim 1, wherein the catalyst is employed in an amount of 0.01–0.1% by weight based on the weight of the toluylenediisocyanate containing up to 50% by weight of the tarry matter.

5. A method according to claim 1, wherein said toluylenediisocyanate is a mixture of toluylene-2,4-diisocyanate and toluylene-2,6-diisocyanate.

References Cited

UNITED STATES PATENTS

| | | | |
|---|---|---|---|
| 3,215,652 | 11/1965 | Kaplan | 260—453X |
| 3,282,975 | 1/1966 | Friedman et al. | 260—453 |
| 3,317,481 | 5/1967 | Youker | 260—453X |
| 3,396,167 | 8/1968 | Davies | 260—453X |
| 3,452,073 | 6/1969 | Shultz | 260—453 |

CHARLES B. PARKER, Primary Examiner

D. H. TORRENCE, Assistant Examiner

U.S. Cl. X.R.

260—2.5, 429.7